(12) United States Patent
Friesel et al.

(10) Patent No.: US 7,499,833 B1
(45) Date of Patent: *Mar. 3, 2009

(54) BERNOULLI TAXONOMIC DISCRIMINATION METHOD

(75) Inventors: Mark A. Friesel, Ewing, NJ (US); Joseph R. Mingrone, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1049 days.

This patent is subject to a terminal disclaimer.

(21) Appl. No.: 10/881,115

(22) Filed: Jun. 30, 2004

Related U.S. Application Data

(60) Provisional application No. 60/484,376, filed on Jul. 2, 2003.

(51) Int. Cl.
*G06F 15/00* (2006.01)

(52) U.S. Cl. ...................................... 702/179
(58) Field of Classification Search ................. 702/179
See application file for complete search history.

(56) References Cited

U.S. PATENT DOCUMENTS 6,308,142 B1 * 10/2001 Choate et al. ............... 702/179
7,047,161 B1 * 5/2006 Friesel ....................... 702/189

* cited by examiner

*Primary Examiner*—Bryan Bui
*Assistant Examiner*—Jonathan Teixeira Moffat
(74) *Attorney, Agent, or Firm*—Duane Morris LLP

(57) ABSTRACT

A sensor includes transducer(s) for observing a region, and produces raw data representing the observed object. The raw data is processed to produce evidence signals representing one or more characteristics of the object. Taxonomic (type) classification is performed by a method using N Bernoulli trials.

2 Claims, 2 Drawing Sheets

BERNOULLI TAXONOMIC DISCRIMINATION METHOD

CROSS-REFERENCE TO RELATED APPLICATIONS

This application claims the benefit of the priority date of Provisional Application No. 60/484,376, filed Jul. 2, 2003.

FIELD OF THE INVENTION

This invention relates to fusion of data resulting from sequential, or at least independent observations of an object.

BACKGROUND OF THE INVENTION

Fusion of digital information is used in areas such as battlefield monitoring and control operations. A battlefield may be observed by a large number of various types of sensors, each of which more-or-less continuously monitors its "field of view" to produce digital information which is evidence of the nature or characteristics of the object or objects within the field of view. If the platform on which the sensor is mounted is moving, the field of view may change with time. Such sensors receive raw data from an observed direction or space in either a passive or active manner, and process the information according to some algorithm in order to make a determination of the nature of the object or condition. For example, a radar system operating as an active sensor may transmit radar signals in a desired direction, and then processes signals returned from a target to determine various characteristics of the received signal in order to characterize the target as, say, an F-15 fighter aircraft rather than a C-130 transport aircraft. A passive sensor might detect the emissions of an active sensor carried by a remote platform, determine the type of sensor detected, and identify platforms capable of carrying such an active sensor. Another passive sensor might respond to the spectral frequency distribution of a jet engine. In all cases, the raw sensed signals are processed to put them into the form of evidence of a characteristic of the object, and the evidence is applied to a decision-making algorithm to produce taxonomic (type) evidence as to the nature of the object.

A great deal of work has been done in the field of fusion of the outputs of various sensors associated with a battle region, in order to combine or rationalize the results of the many sensors observing the region from different vantage points under different operating conditions. Work has also been done on the combining or rationalization of the data produced by each individual sensor during sequential observations of its field.

Bayes equation has been used to update likelihood estimates from new sensor data or measurements. In FIG. 1, a system 10 includes a sensor 12 which observes a region designated generally as 18 lying between skewed field-of-view lines 18'. Sensor 12 includes active or passive transducers and their associated electronics, illustrated as a block 14. Block 14, if active, may be, for example, a radar or lidar system, which transmits signals into region 18 and receives return or reflected signals from targets therein, as for example target object 20. In the case of a passive sensor, block 14 may be, for example, a sensor which senses emissions radiated by a jet engine. Of whatever type, transducer block 14 produces "raw" signals which can be processed to determine some characteristics of the object 20.

The raw transducer data produced by block 14 of FIG. 1 is applied to a processing block 16 and processed to extract information about the object. Such processing, in the case of a radar or lidar, might determine the range of the target from the transducer, its altitude and speed, and possibly some information about its dimensions. In the case of a passive sensor, the emitted radiations might be applied to a spectrum analyzer to determine the frequency distribution. The processed data produced by block 16 represents evidence of the characteristics of the target or object. The evidence information or data produced by block 16 is applied to a block 22.

The evidence data or information applied to block 22 is further processed to produce a taxonomic (type) classification of the sensed object 20. Such a classification in the case of a radar type sensor might use knowledge of the speed of a target in conjunction with its size to determine that it is a fighter aircraft rather than a cargo aircraft. An emission sensor might deem an object having a dominant emission frequency of 100 KHz to be an aircraft with a J-100 engine, and an object with a dominant emission frequency of 120 KHz to include a J-150 engine. The evidence information is subject to error, and the results are described in terms of probabilities. In one prior art arrangement, block 22 performs the taxonomic classification by the use of Bayes equation or algorithm. Use of Bayes equation to update likelihood estimates typically assumes a uniform distribution for initialization, then uses the previous estimate as a prior distribution. Bayes conditional equations can be formed relating objects and evidence of their characteristics $$P(a \mid E_1) = \frac{p(E_1 \mid a)p(a)}{p(E_1 \mid a)p(a) + p(E_1 \mid b)p(b)} \qquad 1$$

where a and b are types of possible objects that might be observed;

p(a) is the prior probability that the object is type a;

p(b) is the prior probability that the object is type b;

$P(a|E_1)$ is the probability that the object is type a when the sensor produced evidence $E_1$.

$P(E_1|a)$ is the probability that the sensor produces evidence $E_1$ when type a is observed.

$P(E_1|b)$ is the probability that the sensor produces evidence $E_1$ when type b is observed. In equation 1, the possible densities of objects, which is to say the prior probabilities p(a) and p(b) are in truth binary and complementary, so that p(a) is either 1 or 0. However, there is no way to know which type is observed, and no means, other than multiple observations as used in the prior art, to select or identify one of type a and type b over the other. The resulting taxonomic determination is made available at a sensor output port 12o.

Improved or alternative fusion is desired.

SUMMARY OF THE INVENTION

A method according to an aspect of the invention is for fusing plural evidence data obtained from a sensor. The method comprises the step of observing at least one object with a sensor to produce N sequential samples of evidence data representing characteristics, including at least a characteristic a, of the object at the times of the samples. A determination is then made of the probability $b_N$ of obtaining $N_1$ occurrences of evidence $E_1$ given that characteristic a was observed, according to $$b_N(N_1 \mid a) = \binom{N}{N_1} p(E_1 \mid a)^{N_1} p(E_2 \mid a)^{N-N_1} \qquad (2)$$

where

N is the number of independent observations of the evidence data of characteristic a of the object;

$N_1$ is the number of times within the group of N samples that evidence $E_1$ is obtained; and $E_2$ is any evidence other than $E_1$. Finally, a determination is made of the likelihood that, characteristic a was observed, when evidence $E_1$ was produced $N_1$ times during the sequence of observations. This final determination is made by $$B_N(a \mid N_1) = \frac{b_N(N_1 \mid a)}{b_N(N_1 \mid a) + b_N(N_1 \mid b)} \qquad (3)$$

where $B_N(a|N_1)$ is the likelihood that a was observed given that evidence $E_1$ occurred $N_1$ times out of N sequential samples;

$b_N(N_1|b)$ is the likelihood that b was observed given that evidence $E_1$ occurred $N_1$ times out of N sequential samples.

DESCRIPTION OF THE INVENTION

Figure 1:
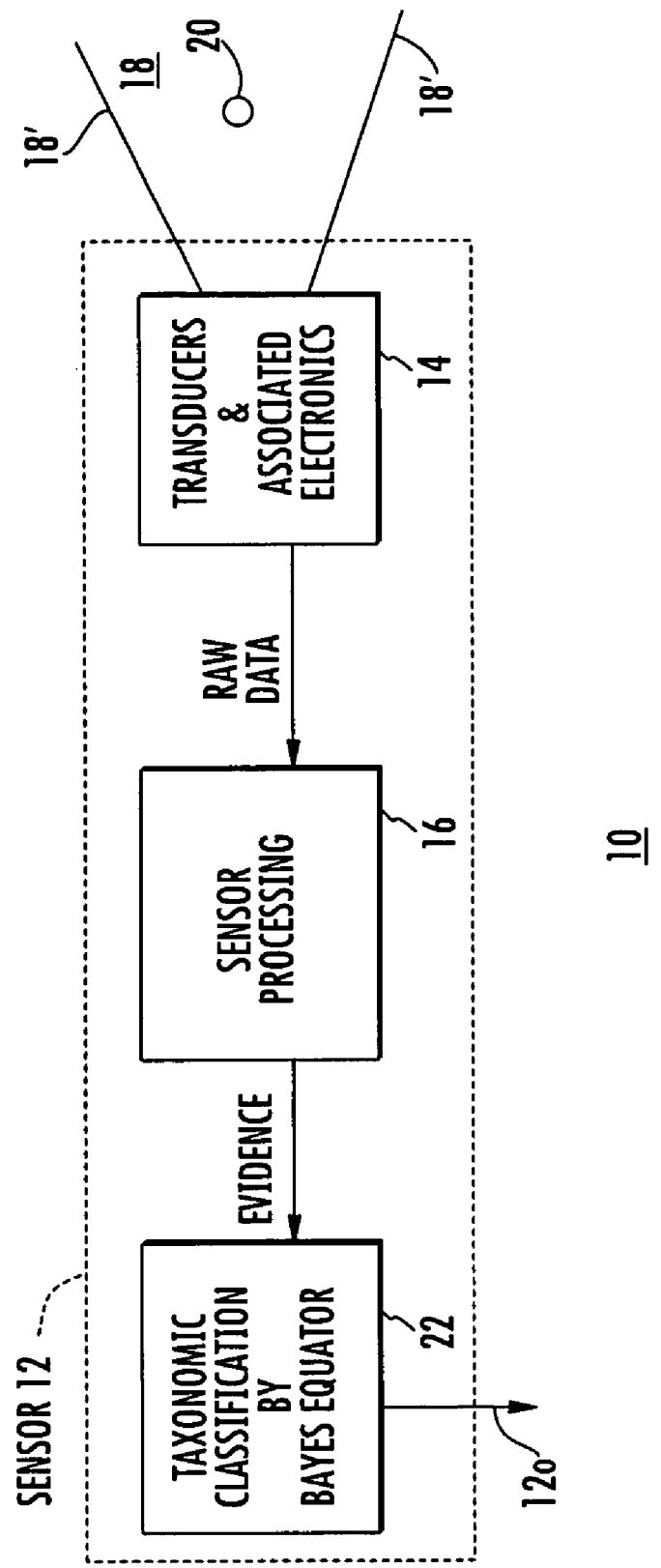
FIG. 1 is a simplified block diagram of a prior-art sensor which produces signals representing evidence of characteristics of the observed object, and which uses Bayes equations for taxonomic determinations of the nature of the object.
Figure 2:
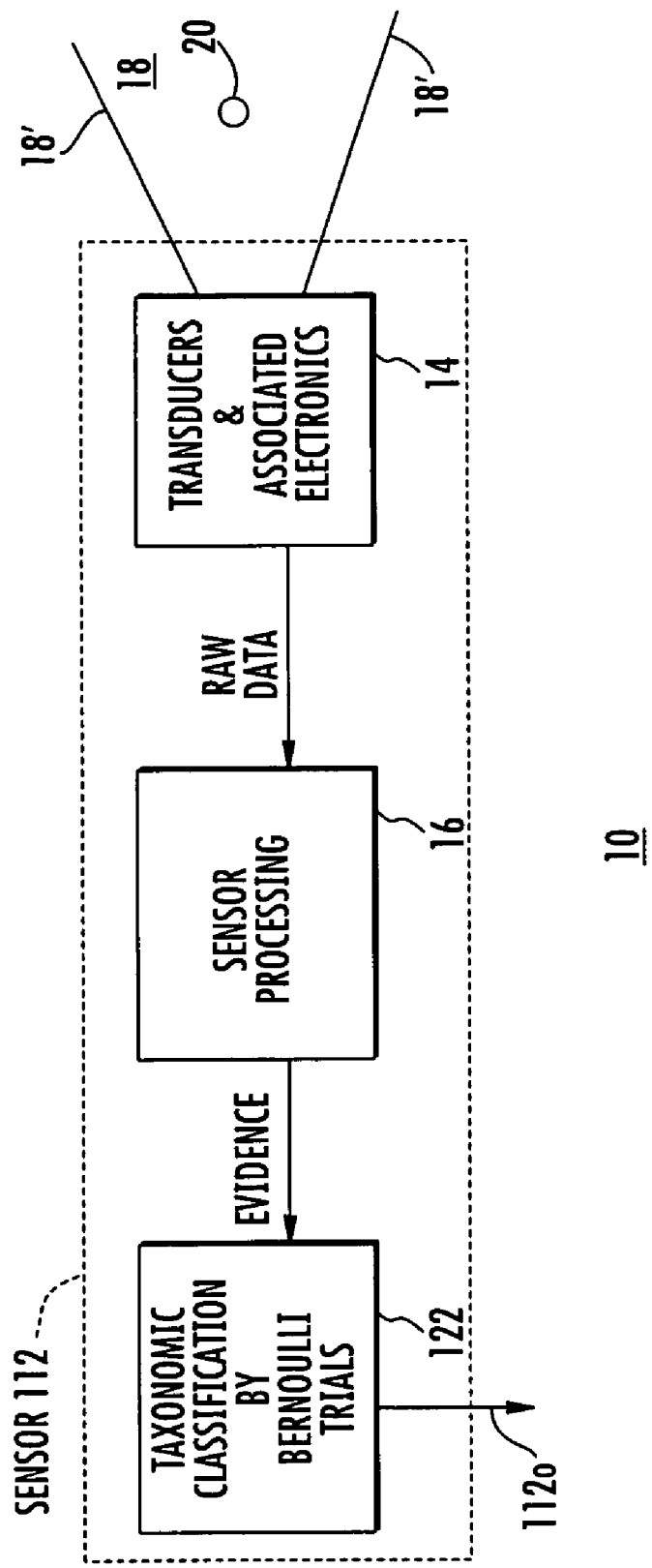
FIG. 2 is a simplified block diagram of a sensor according to an aspect of the invention which uses an algorithm based on N Bernoulli trials.

FIG. 2 substantially corresponds with FIG. 1, and corresponding elements are designated by like reference alphanumerics. In FIG. 2, sensor 112 differs from sensor 12 of FIG. 1 in that the taxonomic classification is performed in a different manner. More particularly, taxonomic classification of the evidence data from block 16 is performed in a block 122, and made available at a sensor output port 112o, not by the use of Bayes equations, but instead by a method based upon Bernoulli trials.

In FIG. 2, sensor 112 makes N repeated or successive observations of object 20, and produces N sets of evidence data representing characteristics, including a characteristic "a", for application to taxonomic classification block 122. Taxonomic classification block 122 processes the evidence data by determining the probability $b_N$ of obtaining $N_1$ occurrences of evidence $E_1$ given that characteristic "a" was observed, according to $$b_N(N_1 \mid a) = \binom{N}{N_1} p(E_1 \mid a)^{N_1} p(E_2 \mid a)^{N-N_1} \qquad (2)$$

where:

$$\binom{N}{N_1} = \frac{N!}{(N-N_1)!N_1!}$$

are binomial coefficients;

N is the number of independent observations of the evidence data of characteristic "a" of the object;

$N_1$ is the number of times within the group of N samples that evidence $E_1$ is obtained; and $E_2$ is any evidence other than $E_1$. Finally, a determination is made of the likelihood that characteristic "a" was observed when evidence $E_1$ was produced $N_1$ times during the sequence of observations. This final determination is made by $$B_N(a \mid N_1) = \frac{b_N(N_1 \mid a)}{b_N(N_1 \mid a) + b_N(N_1 \mid b)} \qquad (3)$$

where $B_N(a|N_1)$ is the likelihood that "a" was observed given that evidence $E_1$ occurred $N_1$ times out of N sequential samples; and $b_N(N_1|b)$ is the likelihood that evidence $E_1$ occurred $N_1$ times out of N samples given that object type "b" was observed.

For example, let $p(E_1|a)=0.7$ and $p(E_1|b)=0.3$. The sensor makes 10 independent observations of an object of unknown type, and reports evidence $E_1$ 5 times, i.e. $N_1=5$. What is the probability that the object is type "a"?

Continuing the example, from equation 4, $b_{10}(N_1=5|a)=252*(0.1681)*(0.0024)=0.1017$. In this case $b_{10}(N_1=5|b)$ also is also 0.1017. From equation 5, $B_{10}(a|5)=0.1017/(0.1017+0.1017)=0.5$. The probability that the observed object is type "a" is 50%.

While the description so far has described two types of evidence, it may be used with more than two types. For more than two types of evidence, andor more than two types of objects, the formula can be extended. Let $E_2$ be a second type of evidence, and let $N_2$ be the number of times it is observed. All other evidence is deemed to be $E_3$ and is observed $N-N_1-N_2$ times. Then the probability $b_N(N_1,N_2|a)$ that $E_1$ is obtained $N_1$ times and $E_2$ is obtained $N_2$ times when object "a" is observed is given by $$b_N(N_1, N_2 \mid a) = \qquad (4)$$
$$\frac{N!}{N_1!N_2!(N-N_1-N_2)!} p(E_1 \mid a)^{N_1} p(E_2 \mid a)^{N_2} p(E_3 \mid a)^{N-N_1-N_2}$$

and the probability $B_N(a|N_1,N_2)$ that object "a" was observed given that $E_1$ is obtained $N_1$ times and $E_2$ is obtained $N_2$ times is given by $$B_N(a \mid N_1, N_2) = \frac{b_N(N_1, N_2 \mid a)}{b_N(N_1, N_2 \mid a) + b_N(N_1, N_2 \mid b)} \qquad (5)$$

where equations (4) and (5) correspond to equations (2) and (3), respectively, for the more limited case. The extension of these formula for cases in which more than two object types are observed, as in the case of a third object type "c." Then $$B_N(a|N_1, N_2) = \frac{b_N(N_1, N_2 | a)}{b_N(N_1, N_2 | a) + b_N(N_1, N_2 | b) + b_N(N_1, N_2 | c)} \quad (6)$$

While the description of the invention has referred to "sequential" samples, the samples can be generated from different sensors, and can even be generated simultaneously, so long as (a) the sensors are independent and observe the same object, (b) the conditional probabilities are the same among the sensors, and (c) $N_1$ is the sum of all occurrences of the evidence $E_1$ and $N_2$ is the sum of all occurrences of $E_2$ on all the contributing sensors. The term "sequential" should be understood to apply to all systems in which these limitations are met, even if the sensors do not produce their measurements in time sequence.

Other embodiments of the invention will be apparent to those skilled in the art. For example, the invention may be used to determine if countermeasures are being used to disguise the object type, to determine if two or more objects are being simultaneously observed, or to determine if the sensor is functioning normally Data fusion according to the invention might be used to aid in autonomous control by a remote-control vehicle in situations, such as a Mars rover, in which the control loop time delay precludes the possibility of timely human control intervention. An automated factory or distribution point might apply the principles of the invention to machinery controlled by cameras used for artificial-sight control.

What is claimed is:

1. A method for fusing plural evidence data obtained from a sensor, said method comprising the steps of:

observing at least one object with a sensor to produce N sequential samples of evidence data representing characteristics, including at least a characteristic a, of said object at the times of the samples;

determining a probability $b_N$ of obtaining $N_1$ occurrences of evidence $E_1$ given that characteristic a was observed, by fusing evidence data employing the equation $$b_N(N_1 | a) = \binom{N}{N_1} p(E_1 | a)^{N_1} p(E_2 | a)^{N-N_1} \quad (2)$$

where:

N is the number of independent observations of the evidence data of characteristic a of the object;

$N_1$ is the number of times within the group of N samples that evidence $E_1$ is obtained; and $E_2$ is any evidence other than $E_1$;

determining the likelihood that characteristic a was observed given that evidence $E_1$ was produced $N_1$ times during the sequence of observations by employing the equation $$B_N(a|N_1) = \frac{b_N(N_1 | a)}{b_N(N_1 | a) + b_N(N_1 | b)} \quad (3)$$

where $B_N(a|N_1)$ is the likelihood that a was observed given that evidence $E_1$ occurred $N_1$ times out of N sequential samples;

$b_N(N_1|b)$ is the likelihood that b was observed given that evidence $E_1$ occurred $N_1$ times out of N sequential samples.

2. A method for fusing plural evidence data obtained from a sensor, said method comprising the steps of:

observing at least one object with a sensor to produce N sequential samples of evidence data representing characteristics, including at least a characteristic a, of said object at the times of the samples;

determining a probability $b_N$ of obtaining $N_1$ occurrences of evidence $E_1$, and $N_2$ occurrences $E_2$, given that characteristic a was observed, by fusing evidence data employing the equation $$b_N(N_1, N_2 | a) = \frac{N!}{N_1! N_2! (N - N_1 - N_2)!} p(E_1 | a)^{N_1} p(E_2 | a)^{N_2} p(E_3 | a)^{N-N_1-N_2} \quad (4)$$

where:

N is the number of independent observations of the evidence data of characteristic a of the object;

$N_1$ is the number of times within the group of N samples that evidence $E_1$ is obtained; and $N_2$ is the number of times within the group of N samples that evidence $E_2$ is obtained;

$E_3$ ... are any evidence other than E1;

determining the likelihood that characteristic a was observed given that evidence $E_1$ was produced $N_1$ times during the sequence of observations by $$B_N(a|N_1, N_2) = \frac{b_N(N_1, N_2 | a)}{b_N(N_1, N_2 | a) + b_N(N_1, N_2 | b)} \quad (5)$$

where $B_N(a|N_1,N_2)$ is the likelihood that a "a" was observed given that evidence $E_1$ occurred $N_1$ times, and $E_2$ occurred $N_2$ times, out of N sequential samples; and $b_N(N_1,N_2|b)$ is the likelihood that b was observed given that evidence $E_1$ occurred $N_1$ times, and $E_2$ occurred $N_2$ times, out of N sequential samples.

* * * * *